United States Patent
Lim

(10) Patent No.: US 7,531,376 B2
(45) Date of Patent: May 12, 2009

(54) ARRAY SUBSTRATE FOR TRANSFLECTIVE LIQUID CRYSTAL DISPLAY DEVICE AND A FABRICATING METHOD THEREOF

(75) Inventor: Joo-Soo Lim, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/651,945

(22) Filed: Sep. 2, 2003

(65) Prior Publication Data
US 2004/0041223 A1 Mar. 4, 2004

Related U.S. Application Data

(62) Division of application No. 10/152,072, filed on May 22, 2002, now Pat. No. 6,649,992.

(30) Foreign Application Priority Data
May 22, 2001 (KR) .............................. 2001-28119

(51) Int. Cl.
H01L 21/00 (2006.01)
H01L 29/786 (2006.01)
(52) U.S. Cl. ........................... 438/69; 438/70; 257/435; 257/72
(58) Field of Classification Search .................. 438/48, 438/69, 70, 128, 149, 151, 157, 283, 479; 257/72, 347, 435
See application file for complete search history.

(56) References Cited

U.S. PATENT DOCUMENTS 6,184,960 B1 * 2/2001 Sawayama et al. .......... 349/139
6,344,888 B2 * 2/2002 Yasukawa ................... 349/113
6,492,700 B1 * 12/2002 Lin et al. .................... 257/435

FOREIGN PATENT DOCUMENTS

KR 2000-20293 4/2000
KR 200-0017061 3/2003

* cited by examiner

Primary Examiner—Ori Nadav
(74) Attorney, Agent, or Firm—Morgan Lewis & Bockius LLP

(57) ABSTRACT

A fabricating method of an array substrate for a transflective liquid crystal display device includes forming a gate line on a substrate having a display portion and a surrounding portion, forming a gate insulating layer covering the gate line, forming a data line on the gate insulating layer, forming a gate pad and a data pad within the surrounding portion, the gate pad connected to the gate line and the data pad connected to the data line, forming a switching device connected to the gate and data lines, forming a reflective electrode within the display portion and connected to the switching device, forming a reflective plate within the surrounding portion, forming a passivation layer on the reflective electrode and the reflective plate, and forming a transmissive electrode on the passivation layer and connected to the reflective electrode.

15 Claims, 15 Drawing Sheets

US 7,531,376 B2

ARRAY SUBSTRATE FOR TRANSFLECTIVE LIQUID CRYSTAL DISPLAY DEVICE AND A FABRICATING METHOD THEREOF

This is a divisional of application Ser. No. 10/152,072, filed on May 22, 2002, now U.S. Pat. No. 6,649,992.

The present invention claims the benefit of Korean Patent Application No. 2001-28119, filed in Korea on May 22, 2001, which is hereby incorporated by reference.

BACKGROUND OF THE INVENTION

1. Field of the Invention

The present invention relates to a liquid crystal display (LCD) device, and more particularly, to a transflective LCD device for a mobile communication system, using a dispensing method.

2. Description of the Related Art

In general, a liquid crystal display (LCD) device has a first substrate that includes a thin film transistor (TFT), a second substrate that includes a color filter layer, and a liquid crystal material layer interposed therebetween. Fabrication of a liquid crystal cell of the LCD device includes formation of a common electrode and a pixel electrode on opposing surfaces of the first and second substrates, respectively, and the liquid crystal material is injected through an injection hole between the first and second substrates. A polarizing plate is attached on an outer surface of each of the first and second substrates to complete the liquid crystal cell. Accordingly, image data is displayed by the LCD device by adjusting a voltage that is applied to the common and pixel electrodes to control transmittance of the liquid crystal cell.

The complete process for fabricating the liquid crystal cell includes a limited number of individual steps. In contrast, fabrication processes for forming the TFT on the first substrate and forming the color filter layer on the second substrate may be classified into a significant number of individual fabrication steps. The individual fabrication steps include processes of forming an orientation film, forming a cell gap, injecting liquid crystal material into the cell gap, and forming individual liquid crystal cells. The process for injecting liquid crystal material is performed through one of a dip method or a contact method. In the dip method, the bonded first and second substrates are dipped into a vessel containing the liquid crystal material, and a pressure difference between the bonded first and second substrates and the vessel causes injection of the liquid crystal material into the cell gap through the injection hole. In the contact method, the injection hole contacts a surface of the liquid crystal material in the vessel, and a pressure difference between the bonded first and second substrates and the vessel causes injection of the liquid crystal material into the cell gap through the injection hole. Both the dip method and the contact method are time consuming and may cause contamination of the injection hole, thereby deteriorating display quality of the LCD device.

To solve the above problems, a dispensing method is suggested wherein a sealant is printed along a boundary of an array substrate that includes a plurality of individual liquid crystal cells. Then, the liquid crystal material is dropped within a region defined by the sealant using a dispenser. Accordingly, processing time is reduced and a production yield is dramatically improved.

FIGS. 1A to 1C are plan views showing a fabricating process of a liquid crystal cell using a dispensing method according to the related art, and FIGS. 1D to 1F are cross-sectional views of the fabrication process shown in FIGS. 1A to 1C according to the related art, respectively.

In FIGS. 1A and 1D, a first substrate 2 includes a plurality of unit cells "A" and a second substrate 4 (in FIGS. 1B and 1E) includes an array line (not shown), a pixel electrode (not shown), and a switching device (not shown). A sub-color filter layer (not shown) that corresponds to the pixel electrode and a black matrix (not shown) that corresponds to a space between the pixel electrodes are formed on the first substrate 2.

In FIGS. 1B and 1E, a sealant 6 is printed on the second substrate 4 corresponding to a boundary of the plurality of unit cells "A." A liquid crystal material 8 (in FIG. 1E) is dropped on an inner region of the sealant 6 using a dispenser, and the first substrate 2 is attached to the second substrate 4 to form a LCD panel 10 (in FIG. 1F).

In FIGS. 1C and 1F, a photo mask 12 (in FIG. 1F) includes a transmissive portion "B" and a blocking portion "C" that are disposed over the LCD panel 10 (in FIG. 1F) for hardening of the sealant 6 by exposure to ultraviolet (UV) light. The transmissive portion "B" corresponds to a position of the sealant 6 of the LCD panel 10, and the blocking portion "C" correspond to an interior position "D" of each of the unit cells "A" (in FIG. 1C). The interior "D" of each of the unit cells "A" provides a mask to prevent a channel region of the TFT on the second substrate 4 from being exposed to the ultraviolet light during the hardening of the sealant 6. Then, the first and second substrates 2 and 4 are fully attached through a subsequent hot press process. Finally, the attached substrates are cut (diced) into individual unit cells "A."

FIG. 2 is a plan view showing a second substrate of a unit cell according to the related art. In FIG. 2, a second substrate 20 includes a display portion "E" and a surrounding portion "F." A plurality of array lines (not shown), a plurality of switching devices (not shown), and a plurality of pixel electrodes (not shown) are formed within the display portion "E." A pad portion "J" is formed to extend from the plurality of array lines at the surrounding portion "F." The pad portion "J" is formed within a region that will be covered with a case of a mobile communication system.

FIG. 3 is a magnified plan view of partial regions "G", "H," and "I" of FIG. 2 according to the related art. In FIG. 3, a second substrate 20 includes a gate line 26 and a data line 28. The gate line 26 includes a gate pad 24 formed within a specific area at one end of the gate line 26. The gate line 26 crosses the data line 28 at a crossing point with an insulating layer (not shown) interposed therebetween, thereby defining a pixel region "P." The data line 28 includes a data pad 30 formed within a specific area at one end of the data line 28. In general, the gate pads 24 and the data pad 30 are disposed within the surrounding portion "F" of the second substrate 20, and an external signal is applied to the gate pad 24 and the data pad 30. A TFT "T" includes a gate electrode 32, an active layer 34 formed on the gate electrode 32, and a source electrode 36 and a drain electrode 38 formed on both ends of the active layer 34. The TFT "T" is disposed adjacent to the crossing point of the gate line 26 and the data line 28. A transflective electrode 40 is formed on the pixel region "P" and is connected to the drain electrode 38 for applying the external signal that drives a liquid crystal layer (not shown). The transflective electrode 40 defines a reflective portion "K" and a transmissive portion "L," and includes a reflective electrode 40a having a transmissive hole 42 and a transmissive electrode 40b formed over or under the reflective electrode 40a with an insulating layer (not shown) interposed therebetween. A sealant (not shown) is formed at the surrounding portion "F" (of FIG. 2) of the array substrate 20.

FIG. 4 is a cross-sectional view taken along IV-IV of FIG. 3 according to the related art, and FIG. 5 is a cross-sectional view taken along V-V of FIG. 3 according to the related art. In FIG. 4, an LCD panel "M" for a mobile communication system 50 includes an attached array substrate 20 and a color filter substrate 52, and a liquid crystal material layer 48 disposed therebetween. The LCD panel "M" may be classified into a display portion "E" and a surrounding portion "T." A backlight 54 is disposed under the LCD panel "M" and is used for a transmissive mode of the LCD panel "M." A case 56 covers the backlight 54 and the surrounding portion "F" of the LCD panel "M" in FIG. 5.

As shown in FIG. 5, an LCD device fabricated using the dispensing method, a black matrix 58 should not be formed within a region where the sealant 46 is formed. Accordingly, a width of the black matrix 58 at the surrounding portion "E" (in FIG. 4) is about one-half of a width for an LCD device fabricated using the injecting method.

FIG. 6 is a cross-sectional view illustrating a relationship between widths of a black matrix and a sealant according to the related art. In FIG. 6, a width of a surrounding portion is 2.8 mm and a width of a black matrix 58 is reduced to an amount "a" that is about one-half of a width of a black matrix for a LCD device fabricated by the injecting method. The black matrix 58 is spaced apart from a sealant 46 by an amount "$\beta_1$." For the sealant having a width of "$\gamma$," since the sealant 46 is formed at a portion spaced apart from an edge of a mobile communication system by an amount "$\beta_2$," the surrounding portion of the mobile communication system is designed to have a width of "$\alpha+\beta_1+\beta_2+\gamma$."

However, as shown in FIG. 5, a light leakage phenomenon may occur in a mobile communication system having a structure according to the related art because light 60 of the backlight 54 under the LCD panel "M" (in FIG. 4) is emitted at a vicinity "S1" of the case 56 through a space "N" between the sealant 46 at the surrounding portion "F" of the LCD panel "M" (in FIG. 4) and the black matrix 58. Therefore, a display quality of an LCD device according to the related art is deteriorated due to a difference in intensity at the surrounding portion of the LCD panel for the mobile communication system 50. In order to decrease a size of the mobile communication system while maintaining a sufficient liquid crystal display area, an area of the display portion of the LCD panel should be kept constant and an area of the surrounding portion of the LCD panel should be reduced. Accordingly, an area of the black matrix is also reduced, thereby subjecting the mobile communication system to a light leakage phenomenon.

SUMMARY OF THE INVENTION

Accordingly, the present invention is directed to a liquid crystal display device that substantially obviates one or more of the problems due to limitations and disadvantages of the related art.

An object of the present invention is to provide a compact and high quality mobile communication system by reducing a light leakage phenomenon at a surrounding portion of an LCD panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a transflective liquid crystal display device includes a substrate having a display portion and a surrounding portion, a gate line on the substrate, a gate insulating layer covering the gate line, a data line on the gate insulating layer, a gate pad and a data pad within the surrounding portion, the gate pad connected to the gate line and the data pad connected to the data line, a switching device connected to the gate and data lines, a reflective electrode within the display portion and connected to the switching device, a reflective plate within the surrounding portion, a passivation layer on the reflective electrode and the reflective plate, and a transmissive electrode on the passivation layer and connected to the reflective electrode.

In another aspect, a fabricating method of an array substrate for a transflective liquid crystal display device includes forming a gate line on a substrate having a display portion and a surrounding portion, forming a gate insulating layer covering the gate line, forming a data line on the gate insulating layer, forming a gate pad and a data pad within the surrounding portion, the gate pad connected to the gate line and the data pad connected to the data line, forming a switching device connected to the gate and data lines, forming a reflective electrode within the display portion and connected to the switching device, forming a reflective plate within the surrounding portion, forming a passivation layer on the reflective electrode and the reflective plate, and forming a transmissive electrode on the passivation layer and connected to the reflective electrode.

In another aspect, a mobile communication system includes a transflective liquid crystal display panel having a display portion and a surrounding portion including a reflective plate, a backlight unit adjacent to the transflective liquid crystal panel, and a case enveloping the surrounding portion and the backlight unit.

In another aspect, a fabricating method for forming a mobile communication system includes forming a transflective liquid crystal display panel having a display portion and a surrounding portion including a reflective plate, forming a backlight unit adjacent to the transflective liquid crystal panel, and forming a case enveloping the surrounding portion and the backlight unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
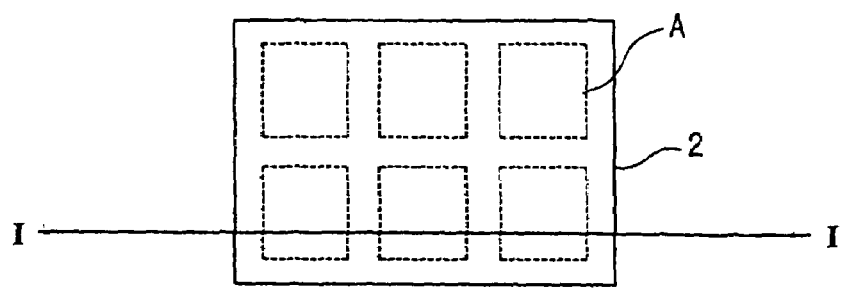
FIGS. 1A to 1C are plan views showing a fabricating process of a liquid crystal cell using a dispensing method according to the related art.
Figure 1B:
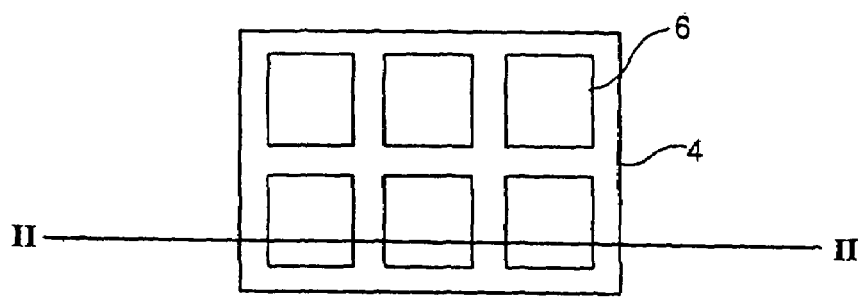
Figure 1C:
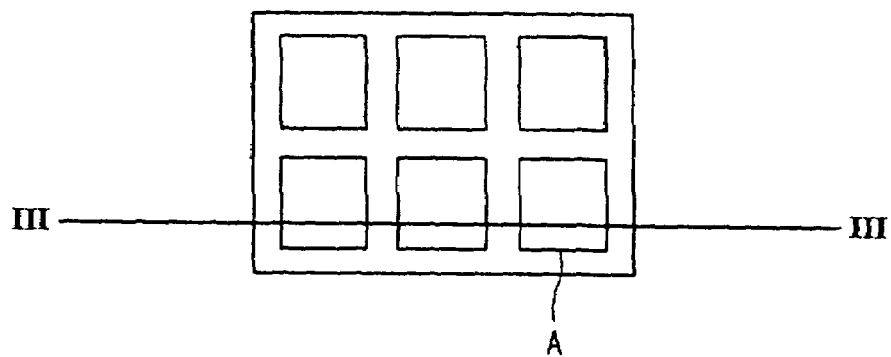
Figure 1D:
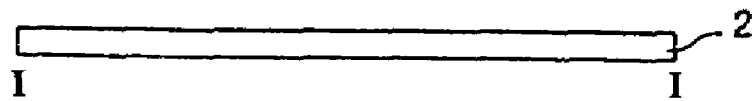
FIGS. 1D to 1F are cross-sectional views of FIGS. 1A to 1C, respectively, according to the related art.
Figure 1E:
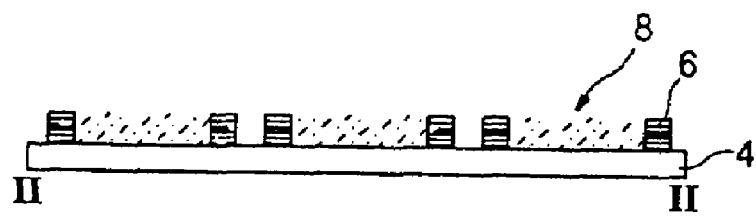
Figure 1F:
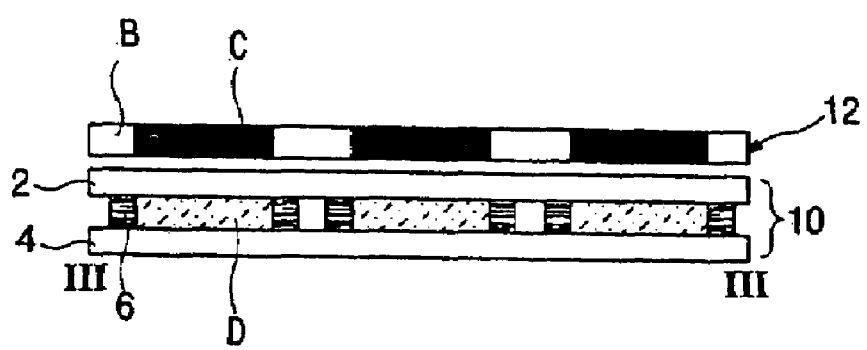
Figure 2:
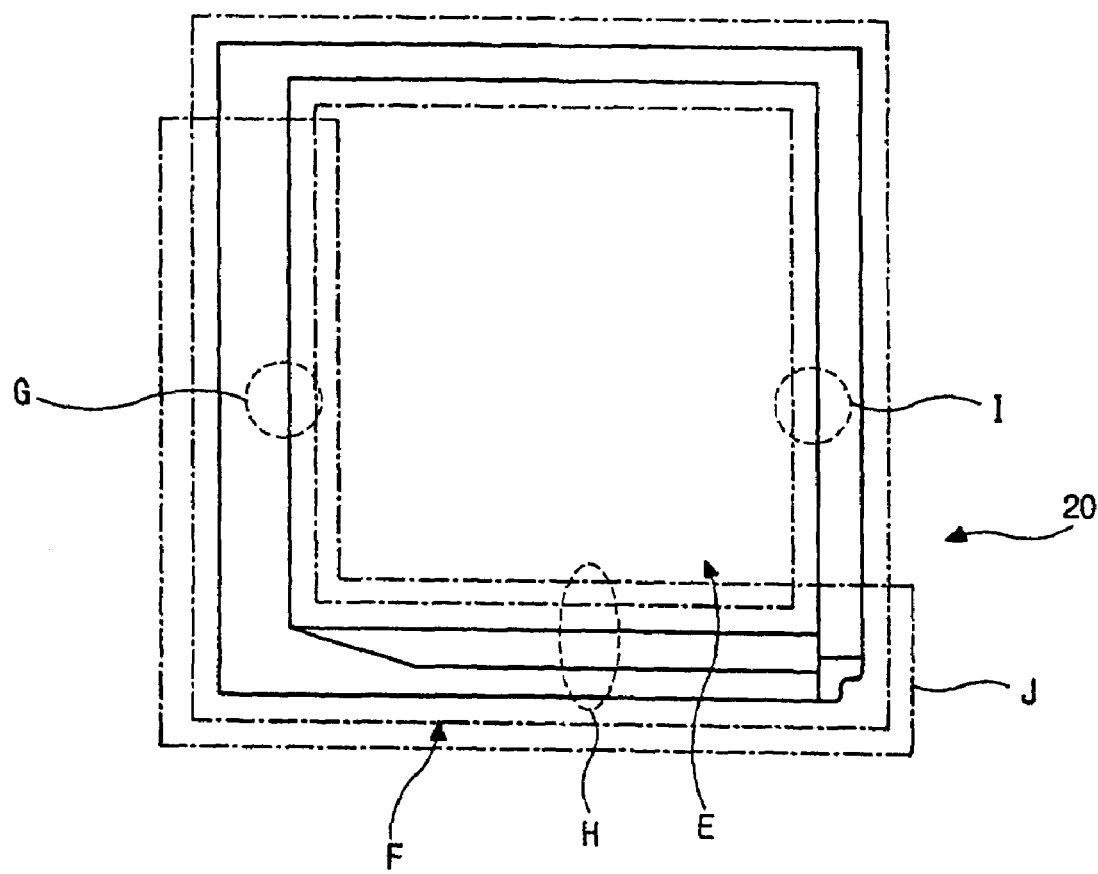
FIG. 2 is a plan view showing a second substrate of a unit cell according to the related art.
Figure 3:
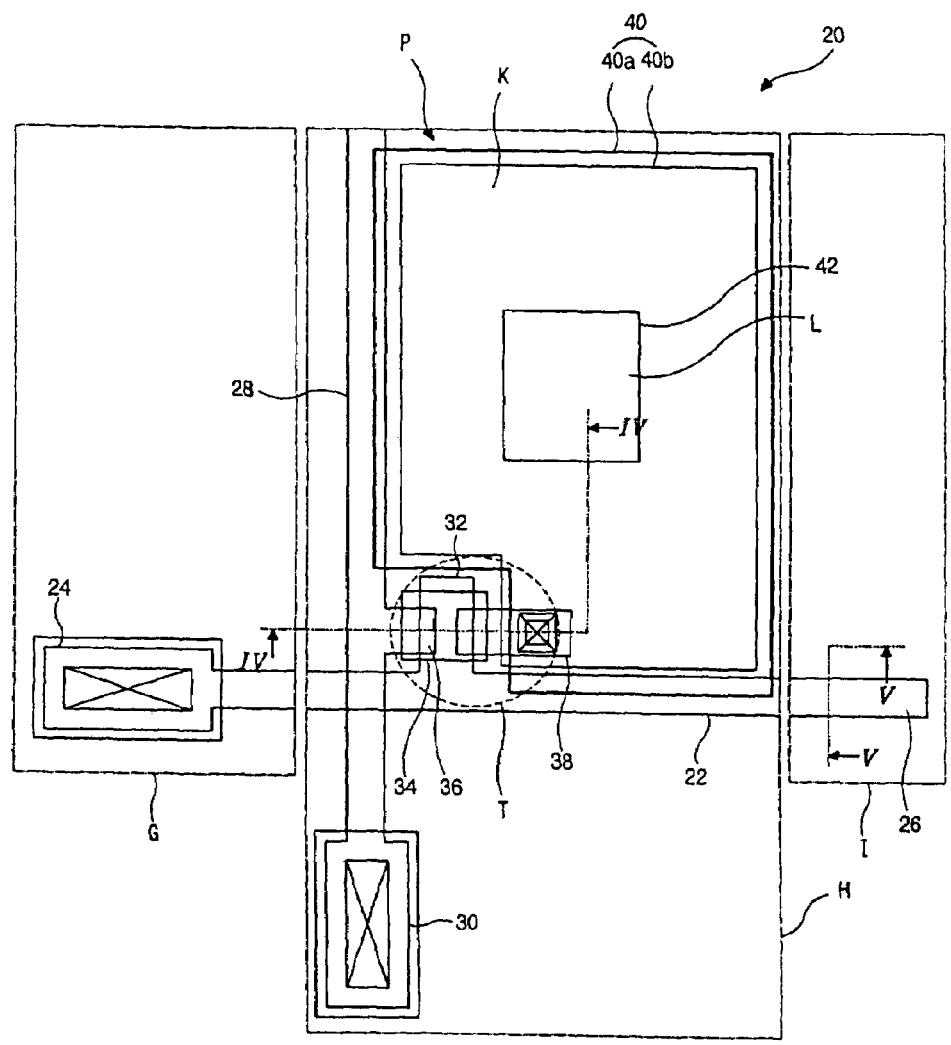
FIG. 3 is a magnified plan view of partial regions "G", "H," and "I" of FIG. 2 according to the related art.
Figure 4:
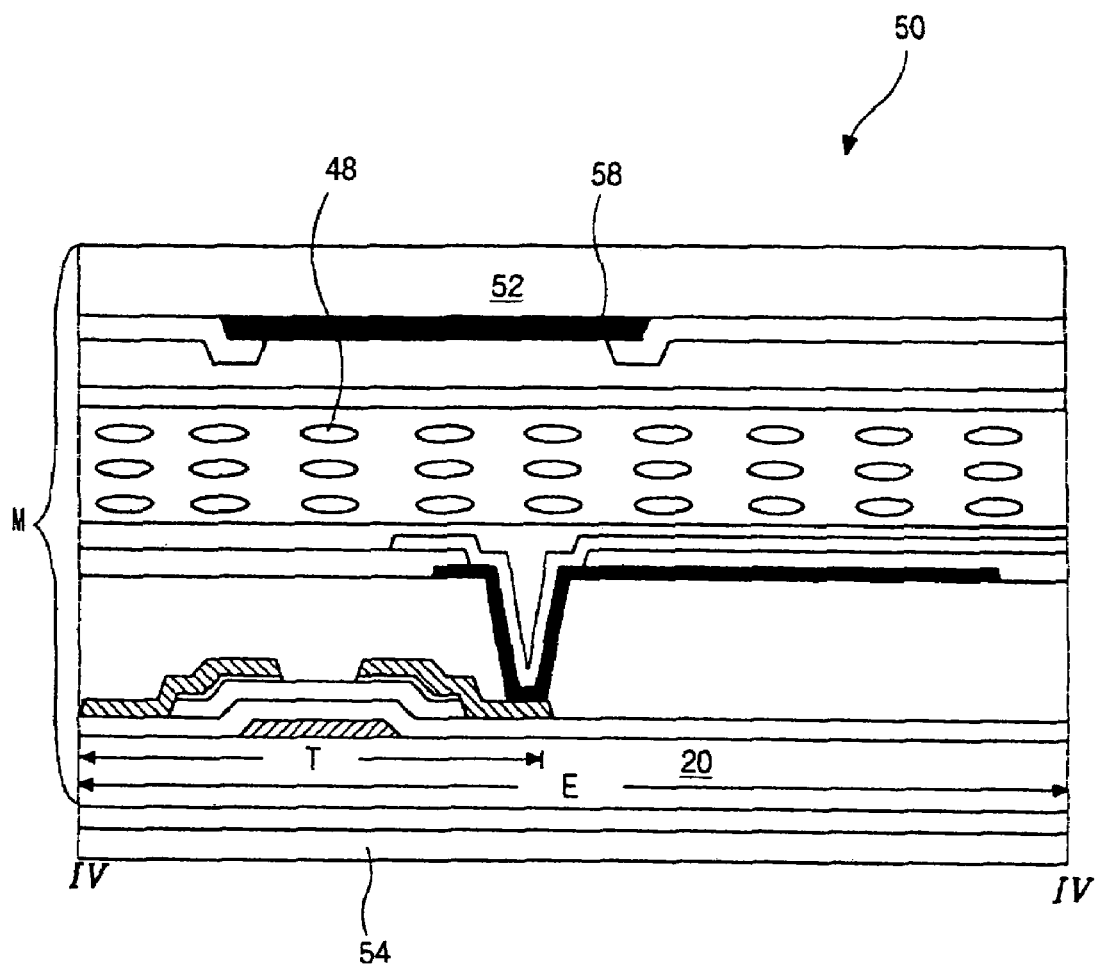
FIG. 4 is a cross-sectional view taken along IV-IV of FIG. 3 according to the related art.
Figure 5:
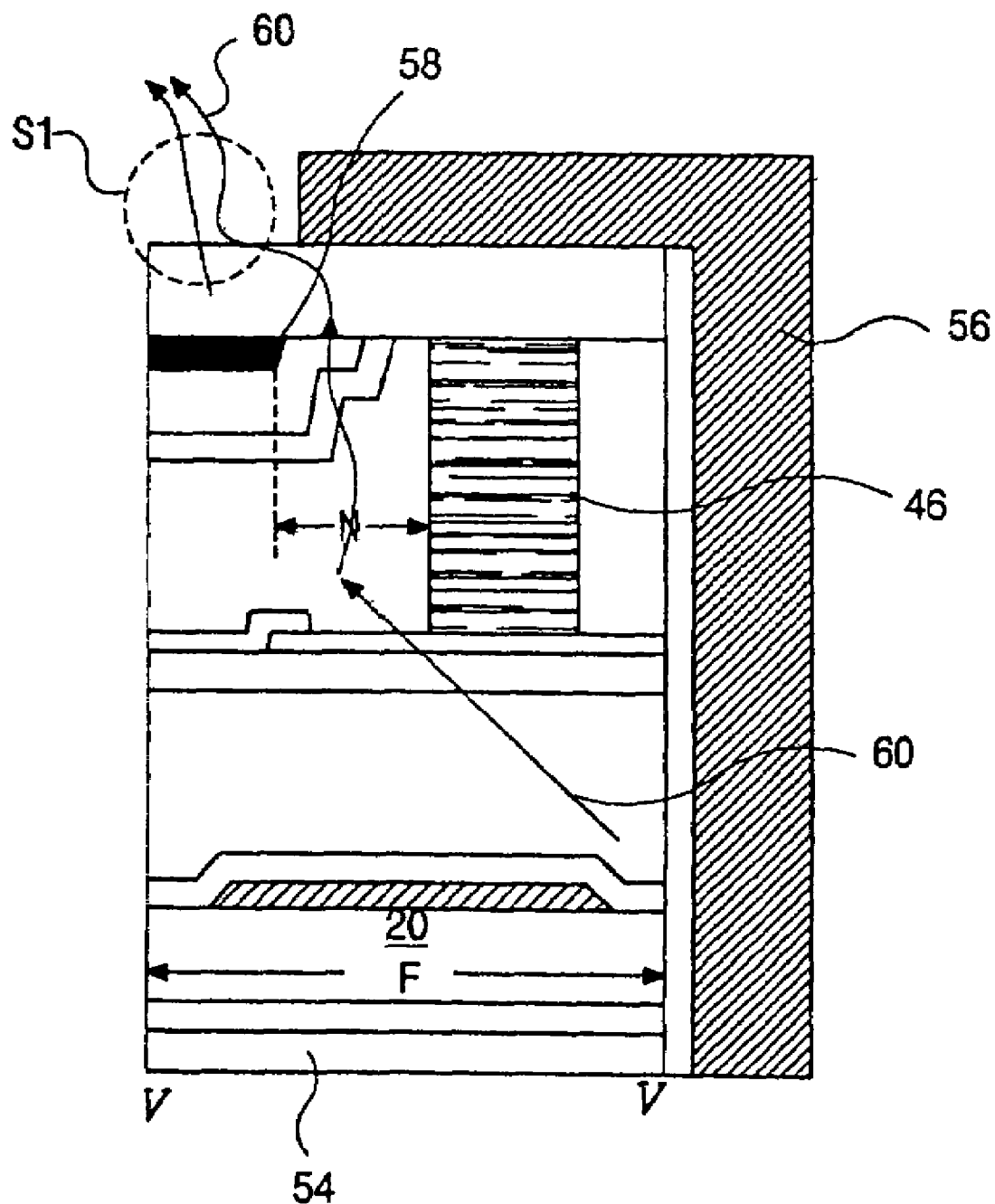
FIG. 5 is a cross-sectional view taken along V-V of FIG. 3 according to the related art.
Figure 6:
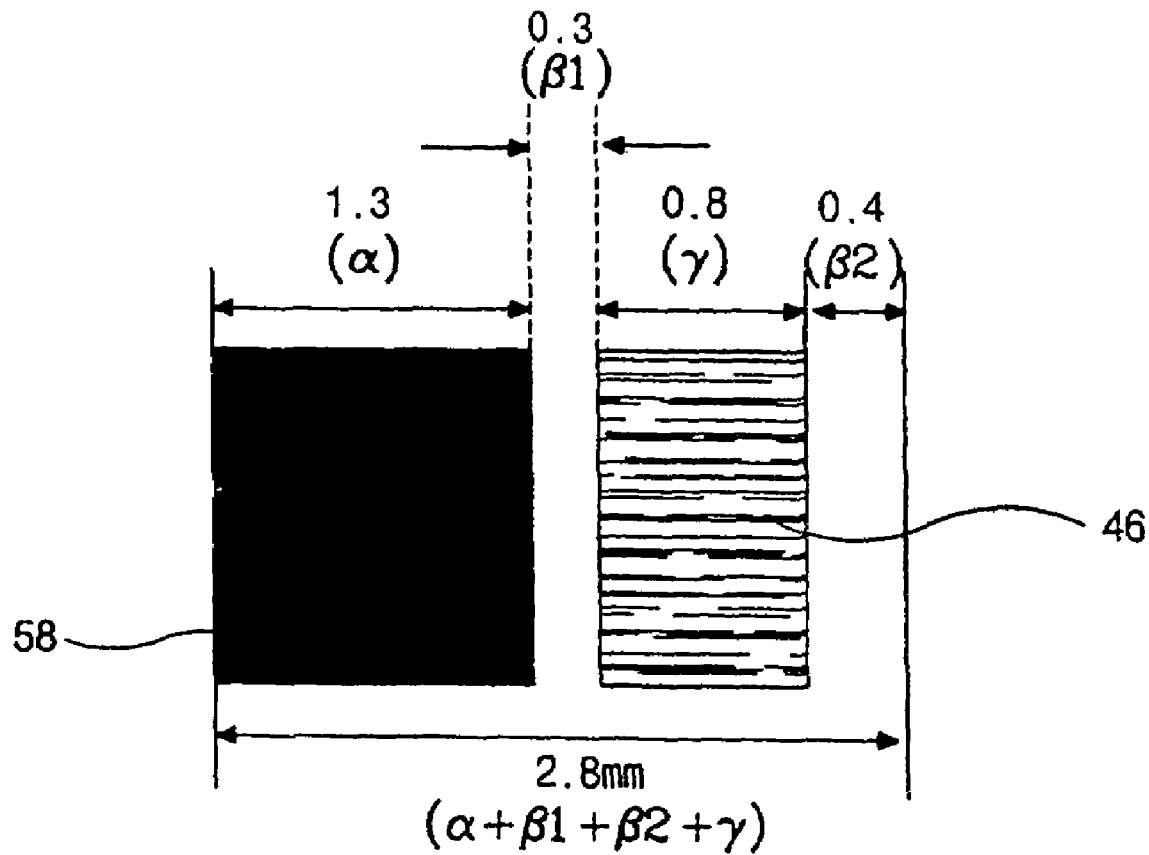
FIG. 6 is a cross-sectional view illustrating a relationship between widths of a black matrix and a sealant according to the related art.
Figure 7:
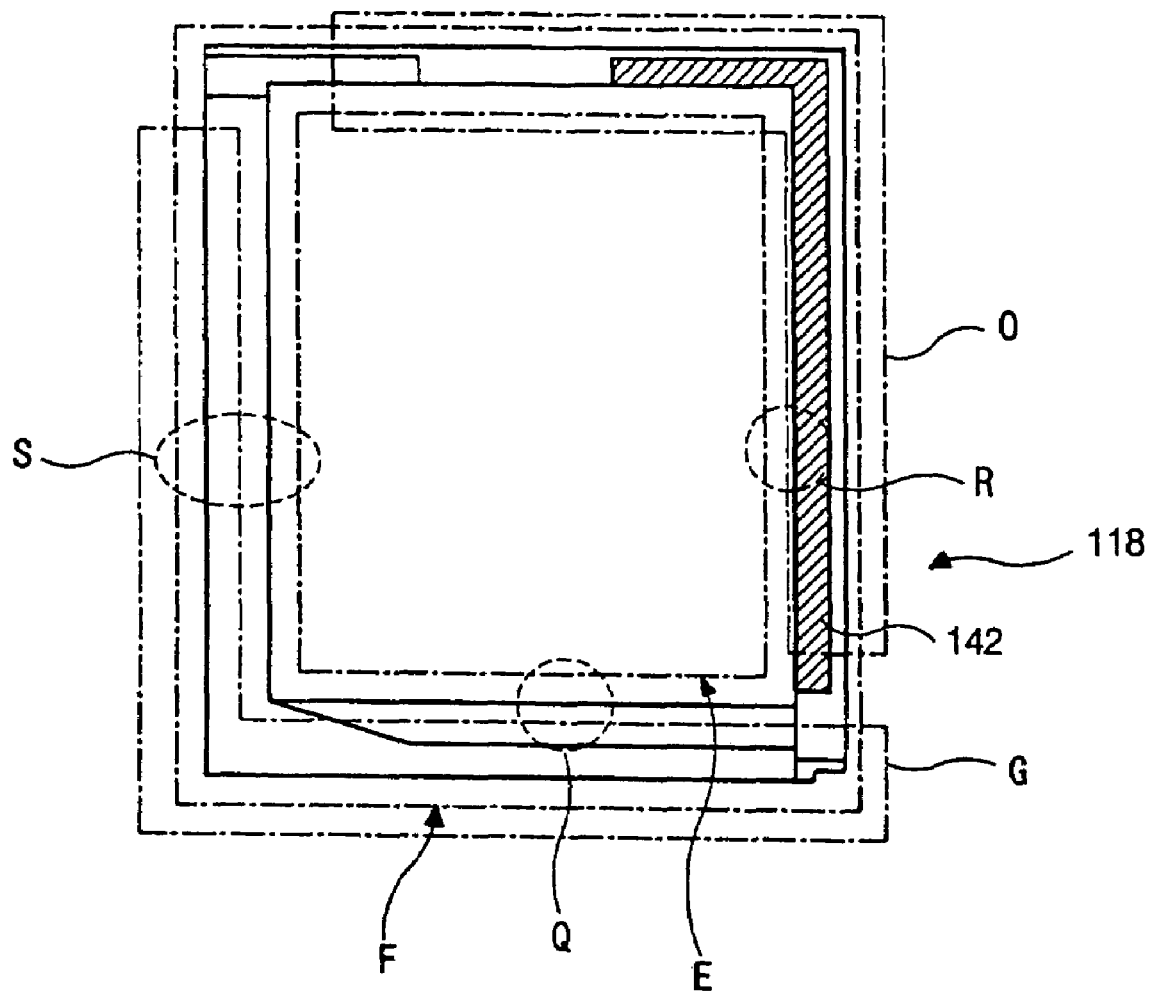
FIG. 7 is a plan view of an exemplary array substrate for a transflective LCD device according to the present invention.

FIG. 7 is a plan view of an exemplary array substrate for a transflective LCD device according to the present invention. In FIG. 7, an array substrate 118 for a transflective LCD device may include a display portion "E" for displaying images, and a surrounding potion "F" having a pad portion "G" for applying a signal to the display portion "E." A plurality of conductive lines (not shown) may be disposed within the display portion "E," and a plurality of pads (not shown) having a specific area may be connected to an end of each of the plurality of conductive lines. Moreover, the pad portion "G" may be disposed along a first direction at a first side of the surrounding portion "F" and along a second direction at a second side of the surrounding portion "T" perpendicular to the first direction. An opaque metal plate 142 may be formed at a region "R" along the second direction at a first side of a portion "Q" that is opposite to a pad region "S" and along the first direction at a second side of the portion "Q." Moreover, the opaque metal plate 142 may be disposed along the first and second side of the portion "Q" opposite of the plurality of pads (not shown). The opaque metal plate 142 may not necessarily be connected to an electrical potential (i.e., electrically floating), and may be formed simultaneously with a reflective plate (not shown) of the array substrate 118.

Figure 8:
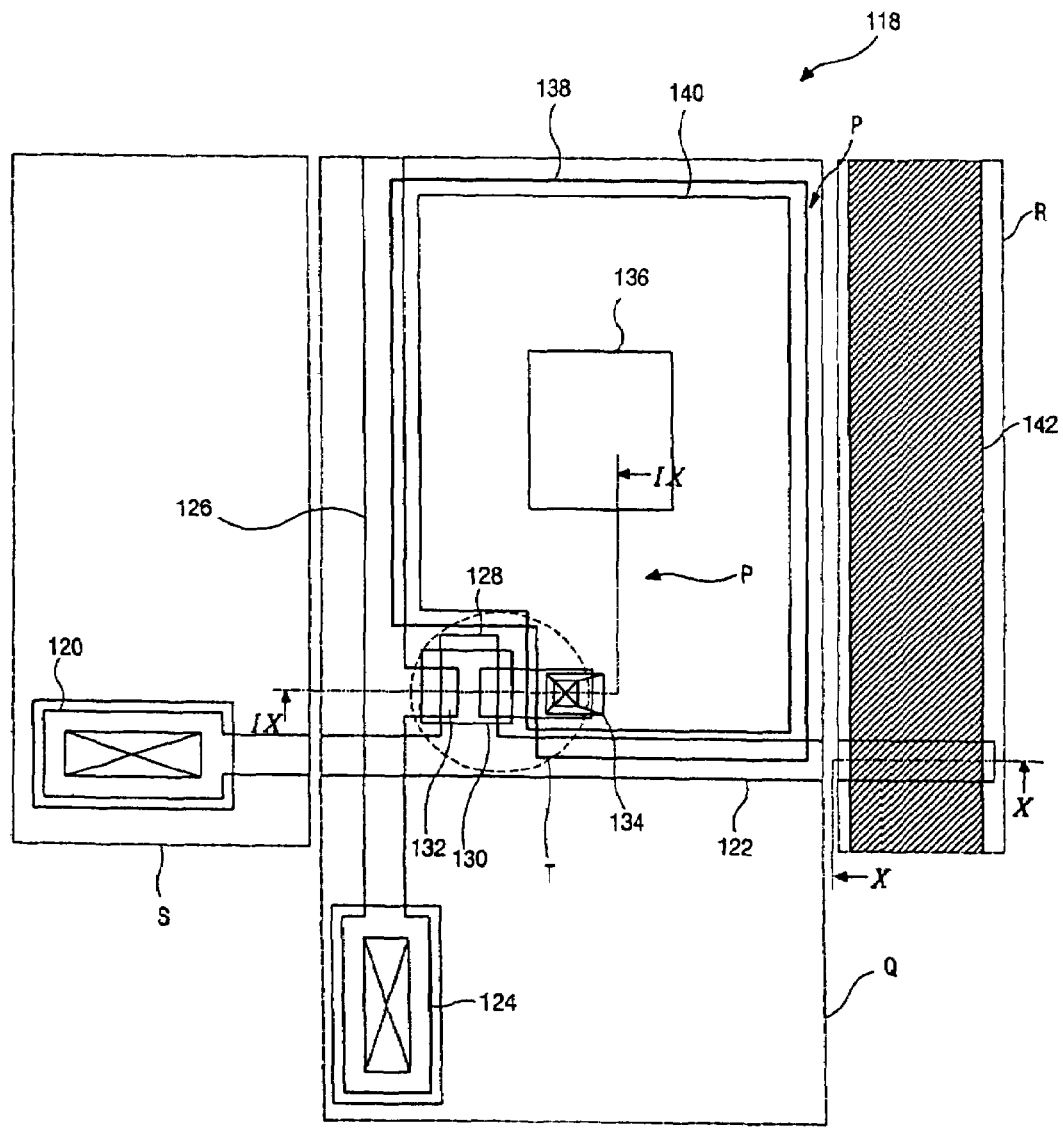
FIG. 8 is a magnified schematic plan view showing regions "P," "Q," and "R" of FIG. 7 according to the present invention.

FIG. 8 is a magnified schematic plan view of FIG. 7 according to the present invention. In FIG. 8, an array substrate 118 for a transflective LCD device may include a gate line 122 having a gate pad 120 within the region "S" disposed along a first direction, and a data line 126 having a data pad 124 within the region "Q" disposed along a second direction perpendicular to the first direction, thereby defining a pixel region "P" at a cross point of the gate line 122 and the data line 126. A TFT "T" may include an active layer 130, a source electrode 132, and a drain electrode 134 formed within a region adjacent to the crossing point of the gate line 122 and the data line 126. A reflective electrode 138 may include a transmissive hole 136, and may be connected to the drain electrode 134. A transparent pixel electrode 140 may overlap the reflective electrode 138 with an insulating layer (not shown) interposed therebetween. In addition, a sealant (not shown) may be formed within the region "R" above the electrically floating reflective plate 142.

FIGS. 9A to 9D are cross sectional views taken along IX-IX of FIG. 8 and show an exemplary fabricating process according to the present invention, and FIGS. 10A to 10D are cross sectional views taken along X-X of FIG. 8 and show the exemplary fabricating process according to the present invention.

Figure 9A:
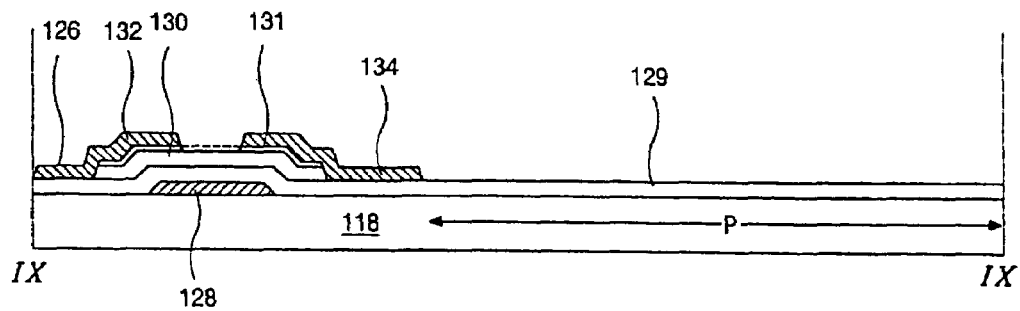
FIGS. 9A to 9D are cross sectional views taken along IX-IX of FIG. 8 and show an exemplary fabricating process according to the present invention.
Figure 10A:
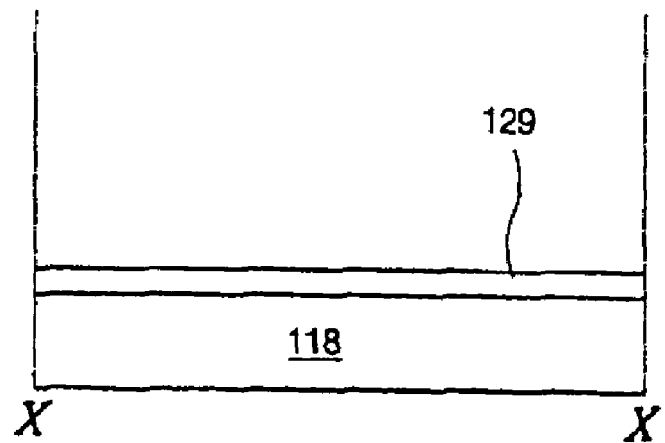
FIGS. 10A to 10D are cross sectional views taken along X-X of FIG. 8 and show the exemplary fabricating process according to the present invention.

In FIG. 9A, a gate line 122 (of FIG. 8), a gate electrode 128, and a gate pad 120 (in FIG. 8) connected to the gate electrode 128 may be formed on a transparent substrate 118 by depositing and patterning a conductive material, for example. The conductive material may include at least one of a conductive metallic material group including aluminum (Al), aluminum alloy, chromium (Cr), molybdenum (Mo) and niobium (Nb). As shown in FIGS. 9A and 10A, a first insulating layer, i.e., a gate insulating layer 129, may be formed on an entire surface of the substrate 118 by depositing at least one of inorganic insulating material group including silicon oxide ($SiO_2$) and silicon nitride (SiNx), for example. Next, an island-shaped active layer 130 may be formed on the gate insulating layer 129 by depositing and patterning an intrinsic amorphous silicon (a-Si:H) material, for example, and an ohmic contact layer 131 may be selectively formed on the island-shaped active layer 130 by depositing and patterning a doped amorphous silicon (n+ or p+ a-Si:H) material, for example. The ohmic contact layer 131 may be formed by an ion-doping process after depositing the intrinsic amorphous silicon (a-Si:H) material. Electric characteristics of the active layer 130 may be controlled depending upon a type of dopant used during ion-doping process. If the ohmic contact layer 131 is doped with an element of a Group III material such as $B_2H_6$, for example, the active layer 130 functions as a p-type semiconductor. Alternatively, if the ohmic contact layer 131 is doped with an element of a Group V material such as $PH_3$, for example, the active layer 130 functions as an n-type semiconductor. Accordingly, the element used during the ion-doping process may be selected based upon a desired application of the TFT "T."

Next, a source electrode 132 and a drain electrode 134 may be formed to overlap opposing end portions the ohmic contact layer 131. A data line 126 may be formed over the substrate 118 by depositing and patterning at least one of a conductive material. The conductive material may include chromium (Cr), niobium (Nb), copper (Cu), antimony (Sb), tungsten (W) and aluminum alloy. The data line 126 may be connected to the source electrode 132, thereby defining a pixel region "P" with the gate line 122 (of FIG. 7), and a data pad 124 (of FIG. 7) of a specific area may be connected to one end of the data line 126. After forming the source and drain electrodes 132 and 134, a process of eliminating the ohmic contact layer 131 exposed between the source and drain electrodes 132 and 134 may be performed.

Figure 9B:
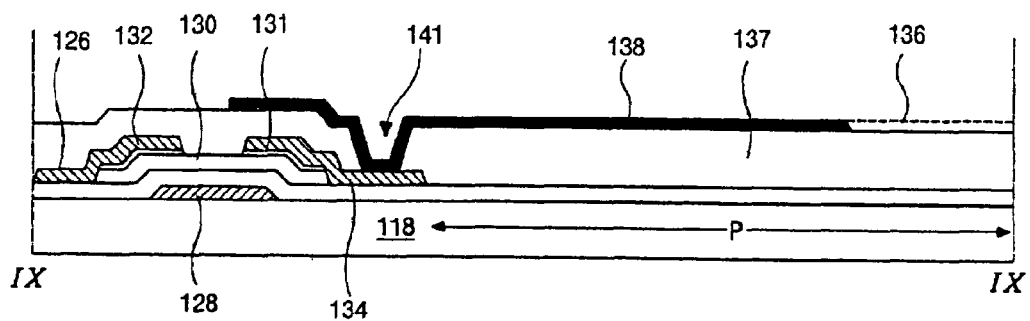
Figure 10B:
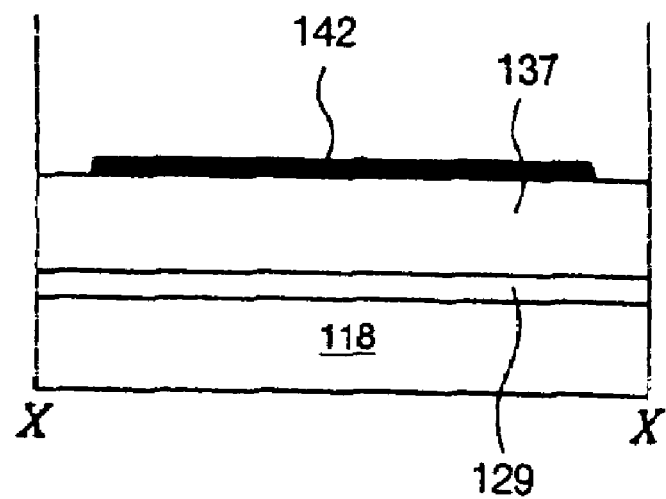

In FIGS. 9B and 10B, a second insulating layer, i.e., a interlayer insulating layer 137, may be formed on the entire surface of the substrate 118 by depositing at least one of an organic material group. The organic material group may include benzocyclobutene (BCB) and an acrylic resin. A first drain contact hole 141 may be formed by patterning the interlayer insulating layer 137, thereby exposing a portion of the drain electrode 134. Next, a reflective electrode 138 may be formed on the interlayer insulating layer 137 to have a transmissive hole 136 by depositing and patterning at least one of a conductive material group, for example. The reflective electrode 138 may be connected to the exposed portion of drain electrode 134, and the conductive material group may include aluminum (Al) and an aluminum alloy having a high reflectance. As shown in FIG. 10B, a reflective plate 142 may be formed simultaneously with the formation of the reflective electrode 138. (in FIG. 9B), and may be electrically floating. The reflective plate 142 may be formed within a region opposite to a region having the gate and data pads.

Figure 9C:
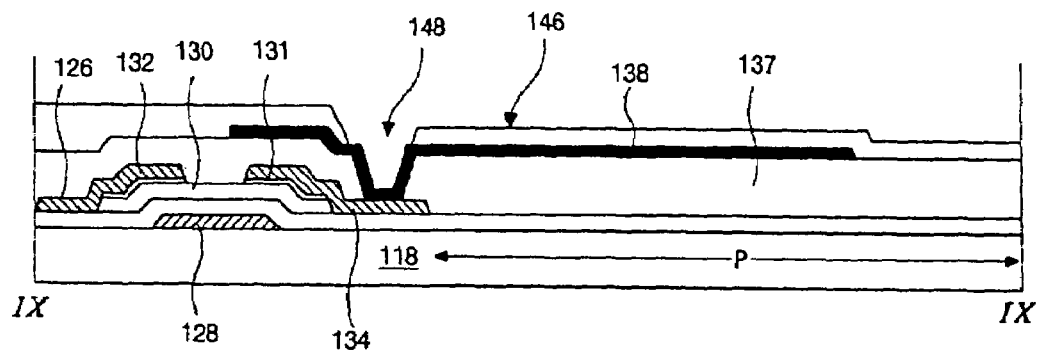
Figure 10C:
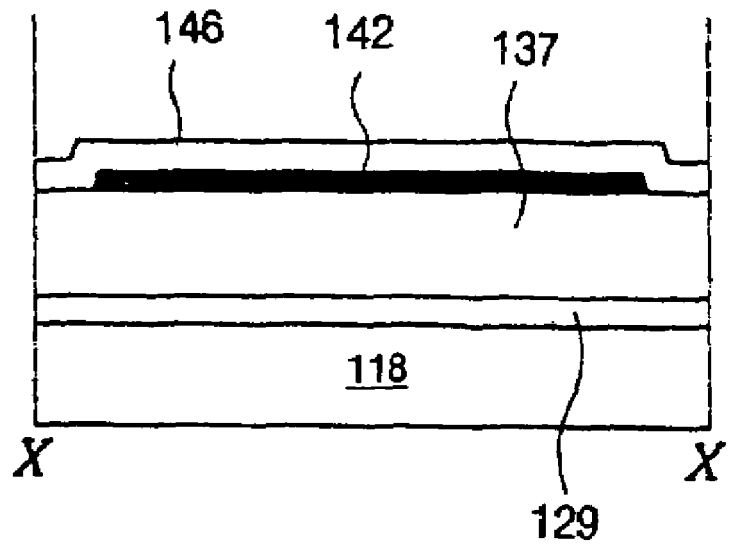

In FIGS. 9C and 10C, a third insulating layer, i.e., a passivation layer 146, may be formed on the entire surface of the substrate 128 having the reflective electrode 138 (in FIG. 9C)

and the reflective plate 142 (in FIG. 10C). The passivation layer 146 may be formed by depositing at least one of an organic material group including benzocyclobutene (BCB) and an acrylic resin, for example. Next, a second drain contact hole 148 (in FIG. 9C) may be formed by etching the passivation layer 146, thereby exposing a portion of the reflective electrode 138 contacting the drain electrode 134.

Figure 9D:
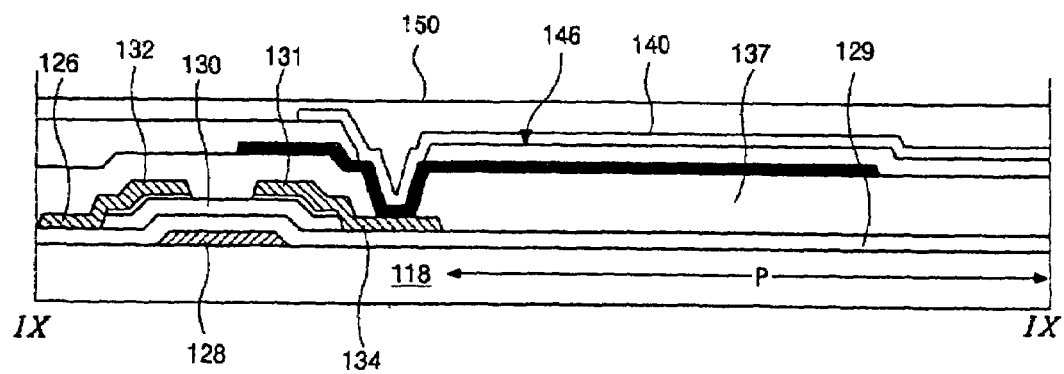
Figure 10D:
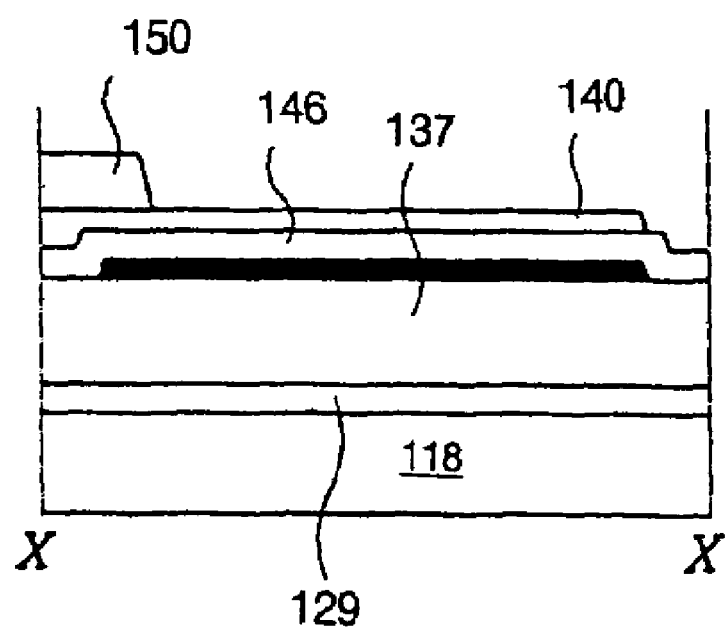

In FIGS. 9D and 10D, a transmissive electrode 140 may be formed at the pixel region "P" (in FIG. 8) to be connected to the reflective electrode 138 by depositing and patterning at least one of a transparent conductive material group that includes indium-tin-oxide (ITO) and indium-zinc-oxide (IZO), for example. Next, an orientation film 150 formed of a transparent polymer material such as polyimide, for example, may be formed on the transmissive electrode 140 (in FIG. 10D), thereby determining alignment characteristics of a later formed liquid crystal material layer.

Figure 11:
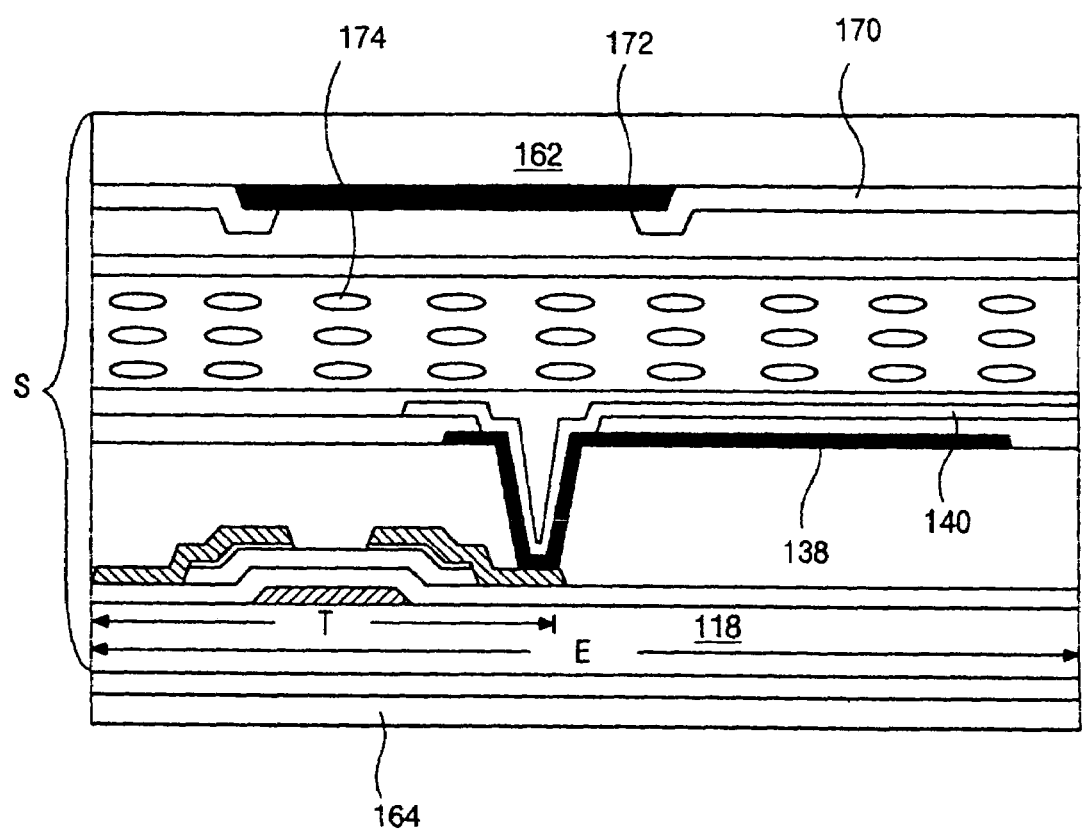
FIG. 11 is a cross-sectional view showing an exemplary display portion of a mobile communication system according to the present invention.
Figure 12:
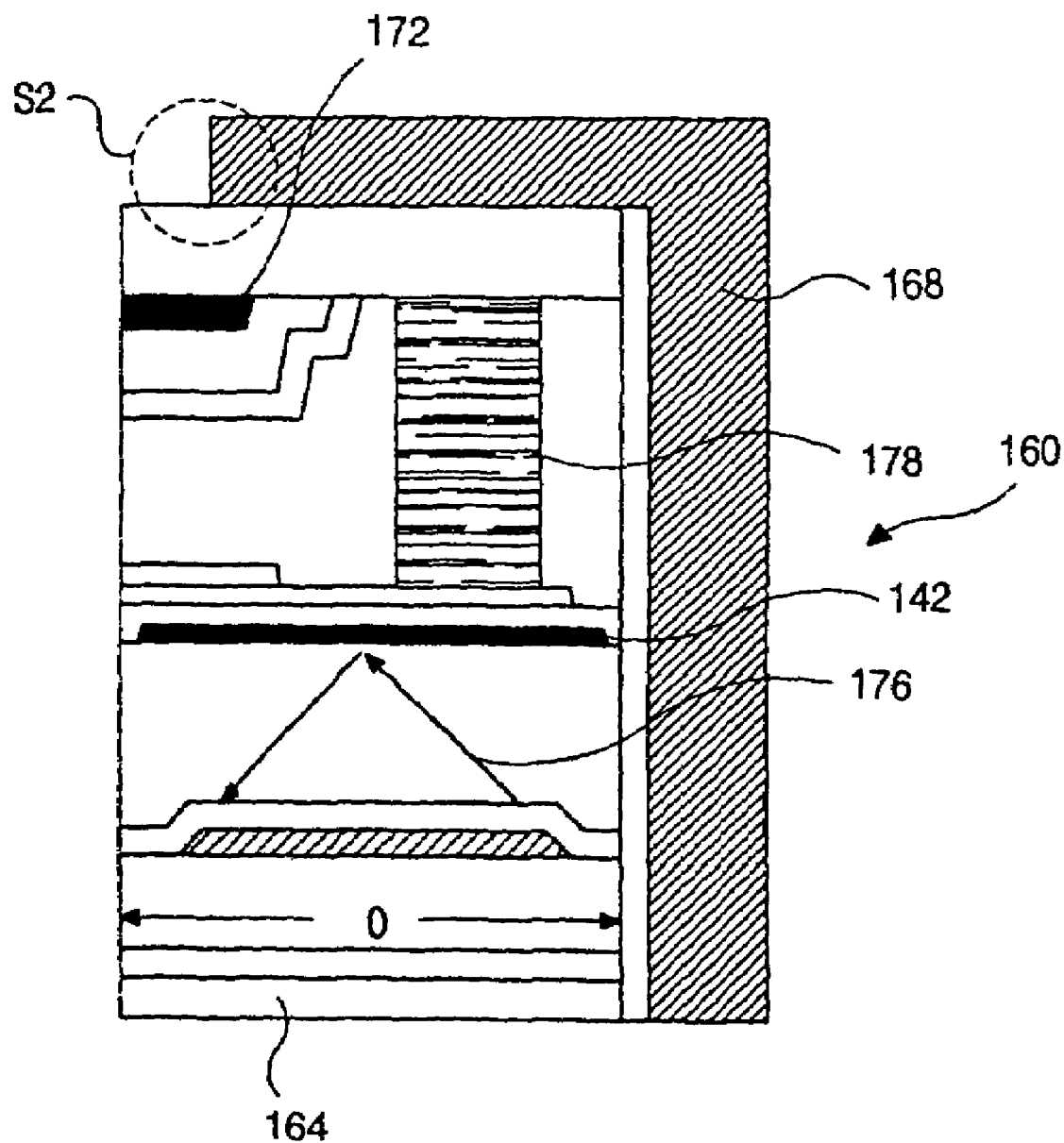
FIG. 12 is a cross-sectional view showing an exemplary surrounding portion of a mobile communication system according to the present invention.

FIG. 11 is a cross-sectional view showing an exemplary display portion of a mobile communication system according to the present invention, and FIG. 12 is a cross-sectional view showing an exemplary surrounding portion of a mobile communication system according to the present invention.

In FIG. 11, a mobile communication system may include an LCD panel "S" having a first substrate 162, a second substrate 118, and a liquid crystal layer interposed therebetween. The first substrate 162 may be commonly referred to as a color filter substrate that may include a color filter layer 170 and a black matrix 172, and the second substrate 118 may be commonly referred to as an array substrate and may include a TFT, a reflective electrode 138, and a transmissive electrode 140. The LCD panel "S" also may include a backlight unit 164 over an outer surface of the second substrate 118, and a case 168 (in FIG. 12) enveloping the backlight unit 164 and a surrounding portion "O" of the LCD panel "S." The LCD panel "S" may include a display portion "E," which is not covered by the case 168 (in FIG. 12), and the surrounding portion "O," which is covered by the case 168. As shown in FIG. 12, a reflective plate 142, which may be electrically floating, may be formed under a sealant 178 of the surrounding portion "O" to reflect incident light 176 emitted from the backlight unit 164. Accordingly, light leakage of the surrounding portion "O" within a vicinity "S2" of the case may be prevented.

It will be apparent to those skilled in the art that various modifications and variations can be made in the liquid crystal display device of the present invention without departing from the spirit or scope of the invention. Thus, it is intended that the present invention covers the modifications and variations of this invention provided they come within the scope of the appended claims and their equivalents.

What is claimed is:

1. A fabricating method of an array substrate for a transflective liquid crystal display device, comprising:
   forming a gate line on a substrate having a display portion and a surrounding portion;
   forming a gate insulating layer covering the gate line;
   forming a data line on the gate insulating layer;
   forming a gate pad and a data pad within the surrounding portion, the gate pad connected to the gate line and the data pad connected to the data line;
   forming a switching device connected to the gate and data lines;
   forming a reflective electrode within the display portion and connected to the switching device;
   forming a sealant within the surrounding portion;
   forming a reflective plate within the surrounding portion and beneath and overlapping the sealant, wherein the reflective plate is disposed exclusively only within a first region opposite to a second region where the gate and data pads are disposed, and wherein the reflective plate surrounds only two sides of the display portion;
   forming a passivation layer on the reflective electrode and the reflective plate; and
   forming a transmissive electrode on the passivation layer and connected to the reflective electrode.

2. The fabricating method according to claim 1, wherein the switching device includes a thin film transistor.

3. The fabricating method according to claim 1, wherein forming the reflective plate and forming the reflective electrode are performed simultaneously.

4. The fabricating method according to claim 1, further comprising etching he passivation layer to form a contact hole exposing a portion of the reflective electrode.

5. The fabricating method according to claim 4, wherein the transmissive electrode is connected to the reflective electrode through the contact hole.

6. The fabricating method according to claim 1, wherein the transmissive electrode includes a transparent conductive material.

7. The fabricating method according to claim 1, further comprising forming an interlayer insulating layer on the gate insulating layer and the switching device.

8. The fabricating method according to claim 1, wherein the sealant is formed on the transmissive electrode.

9. The fabricating method according to claim 1, wherein the reflective plate is electrically floating.

10. A fabricating method for forming a mobile communication system, comprising:
    forming a transflective liquid crystal display panel having a display portion and a surrounding portion, wherein the transflective liquid crystal panel includes a gate pad, a data pad, a reflective plate within the surrounding portion, wherein the surrounding portion includes a sealant formed above and overlapping the reflective plate, wherein the reflective plate is disposed exclusively only within a first region opposite to a second region where the gate and data pads are disposed, and wherein the reflective plate surrounds only two sides of the display portion;
    forming a backlight unit adjacent to the transflective liquid crystal panel; and forming a case enveloping the surrounding portion and the backlight unit.

11. The fabricating method according to claim 10, further comprising forming a color filter layer, a transflective electrode, a gate line, and a data line within the display portion.

12. The fabricating method according to claim 11, wherein forming the transflective electrode includes forming a reflective electrode and a transmissive electrode.

13. The fabricating method according to claim 12, wherein the reflective electrode and the transmissive electrode overlap.

14. The fabricating method according to claim 12, wherein forming the reflective electrode includes forming a transmissive hole.

15. The fabricating method according to claim 12, wherein forming the reflective plate and forming the reflective electrode are simultaneously performed.

* * * * *